G. R. YANCEY.
BALL COCK.
APPLICATION FILED SEPT. 24, 1910.
996,743.
Patented July 4, 1911.
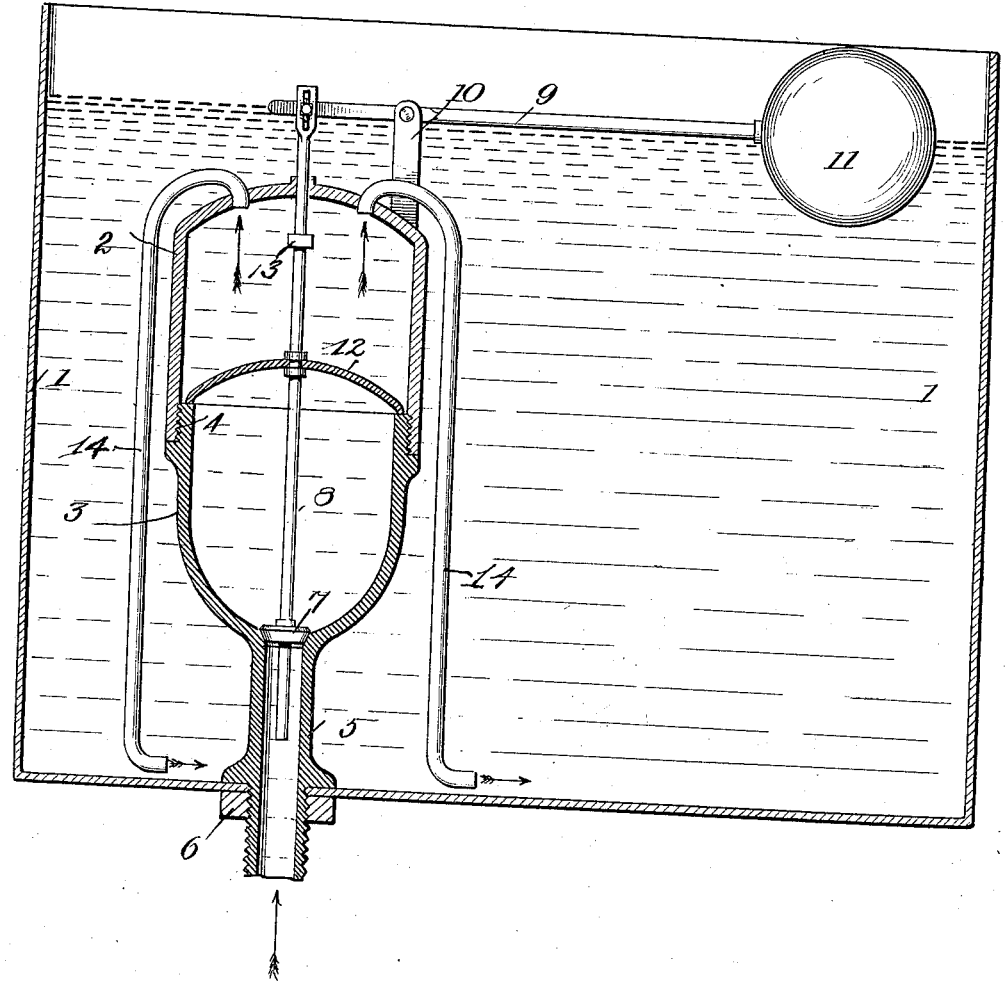
Witnesses
F. C. Barry
M. C. McFall
Inventor
George R. Yancey
By Max A. Schmidt
Attorney

UNITED STATES PATENT OFFICE.

GEORGE R. YANCEY, OF LOUISVILLE, KENTUCKY.

BALL-COCK.

996,743. Specification of Letters Patent. Patented July 4, 1911.

Application filed September 24, 1910. Serial No. 583,657.

*To all whom it may concern:*

Be it known that I, GEORGE R. YANCEY, a citizen of the United States, residing at Louisville, in the county of Jefferson and State of Kentucky, have invented certain new and useful Improvements in Ball-Cocks, of which the following is a specification.

This invention relates to that class of valves commonly known as "ball-cocks" which are employed in connection with flushing tanks to control the inlet thereto.

It is the object of the present invention to provide a valve of the kind stated which is noiseless in operation, and to this end it consists in a novel construction and arrangement of parts to be hereinafter described and claimed.

In order that the invention may be better understood, reference is had to the accompanying drawing forming a part of this specification, in which drawing a vertical sectional view of the valve is shown.

Referring specifically to the drawing, 1 denotes the tank to which the invention is applied. In the tank is located a closed vessel comprising upper and lower portions 2 and 3, respectively, connected by a screw or other suitable joint 4. The upper portion of the vessel is slightly greater in diameter than the lower portion. On the bottom of the lower portion of the vessel is a nipple extension 5 which passes through an opening in the bottom of the tank and is made fast thereto by a suitable coupling nut 6. The supply pipe is connected to the nipple, on the outside of the tank, in any suitable manner. At the point where the nipple opens into the vessel is a seat for a valve 7 which is in the form of a plug, and the latter may be formed of rubber or some composition usually employed for valve plugs. The valve 7 is carried by a stem 8 which extends vertically through the vessel and passes out of the same through an opening in the top of the upper portion 2. Above the vessel, the rod is connected to a lever 9 pivoted to a bracket 10 mounted on the top of the vessel and carrying a float 11. The valve is, therefore, controlled by the float, the lowering of the latter when the tank empties causing the valve to open. When the tank fills, the float rises and closes the valve.

The stem 8 carries a dished plate 12 which forms a partition in the upper portion 2 of the vessel. This partition is spaced a sufficient distance from the wall of the vessel so as to permit the water to flow past said partition to the top of the vessel, when the valve is open. The stem 8 also has a stop collar 13 which is adapted to engage the top of the vessel, on the inside thereof, and thus limit the upward movement of the stem and the extent of the opening movement of the valve.

To the top of the upper portion 2 of the vessel are connected outlet pipes 14 which extend downwardly and terminate in lateral bends close to the bottom of the tank, said bends being the discharge ends of the pipes. The water is therefore discharged into the tank close to the bottom thereof, and as there is always sufficient water in the tank to cover the discharge ends of the pipes, the water is discharged without noise.

The dished plate 12 is designed to act as a baffle-plate to regulate the pressure of the water in the upper and lower portions of the vessel; it can therefore be made of any desired size to suitably control the flow of water into the upper chamber.

I claim:

1. The combination with a tank, and its inlet, of a vessel in the tank to which the inlet is connected, a valve in the vessel controlling the flow from the inlet into the vessel, an actuating stem carrying said valve and extending from the vessel, a partition carried by the stem within the vessel, said partition being spaced from the wall of the vessel, and an outlet pipe connected to the vessel, and having its discharge end in close proximity to the bottom of the tank.

2. The combination with a tank, and its inlet, of a vessel in the tank to which the inlet is connected, a valve in the vessel controlling the flow from the inlet into the vessel, an actuating stem carrying said valve and extending from the vessel, a partition carried by the stem within the vessel, said partition being in the form of a baffle plate, and being adapted to regulate and control the flow of water from the lower to the upper portion of the vessel, and an outlet pipe connected to the vessel, and having its discharge end in close proximity to the bottom of the tank.

In testimony whereof I affix my signature in presence of two witnesses.

GEORGE R. YANCEY.

Witnesses:
ALEXANDER C. SCHUMAN,
GEORGE E. SCHUMAN.

Copies of this patent may be obtained for five cents each, by addressing the "Commissioner of Patents, Washington, D. C."